Sept. 9, 1969  V. BENATAR  3,465,869

CONTROL SYSTEM

Filed May 31, 1967  2 Sheets-Sheet 1

INVENTOR
VICTOR BENATAR
BY: Walter M. Rodgers
ATTORNEY

Sept. 9, 1969     V. BENATAR     3,465,869
CONTROL SYSTEM

Filed May 31, 1967     2 Sheets-Sheet 2

INVENTOR
VICTOR BENATAR
BY: *Walter M. Rodgers*
ATTORNEY

3,465,869
CONTROL SYSTEM
Victor Benatar, Atlanta, Ga., assignor to The Mead Corporation, a corporation of Ohio
Filed May 31, 1967, Ser. No. 642,530
Int. Cl. B65g 43/08
U.S. Cl. 198—110       6 Claims

ABSTRACT OF THE DISCLOSURE

A control system utilizing pneumatic principles may be utilized to control the speed of a machine in coordination with variations in the rate of supply and backlog of incoming items to be processed through the machine. The term "backlog" is used to denote items which are in physical contact with each other and awaiting further processing. More specifically, a plurality of pneumatic valves having elongated feeler elements disposed for engagement by incoming items are arranged to supply pressure fluid to a pressure averaging relay during intervals when the feeler elements are in contact with incoming items and during which time the sensing valves are open. If no item is in engagement with a feeler element, the sensing valve is closed and a metered exhaust port is effective to modify the output pressure of the averaging relay. Pressure from the averaging relay is supplied through a suitable selector and solenoid control valve to a pneumatic control device which in turn varies the speed of the driven machine.

---

In its broader aspects the control system of this invention may comprise sensing means responsive to relative changes during a given time interval in the number of incoming items moving along a predetermined path together with any accumulated backlog of such items for producing a control signal dependent on such conditions, control means for supplying a resultant signal to suitable operating means by which the number of backlog items is substantially stabilized at a desired level irrespective of variations in the rate of input of incoming items.

In conventional speed control systems, it is the practice to allow a backlog of items to accumulate and then to sense such accumulation following which time delay means are employed to defer action of the associated control means. The time delay is necessary in such systems to provide an opportunity to sense a plurality of items and thus to prevent undesired speed changes which might result from response of the control to the passage of a single item which might not be representative of the condition to be controlled.

According to the present invention, time delay is not necessary because the sensing elements employed are arranged so as to provide a maximum response when all such elements are responding to an accumulation of backlog and to provide a minimum response when all such elements are responsive to incoming items which are spaced apart in the direction of travel by a random spacing. Of course an intermediate condition prevails when one or more sensing elements is responsive continuously to backlog items and when one or more sensing elements responds intermittently to spaced incoming items to produce a resultant signal. Thus the operating means is responsive to both the presence of backlog and to the rate at which items approach the backlog items at any given instant.

Figure 1:
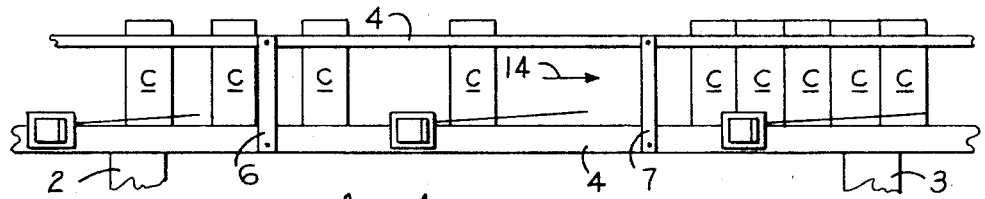
Figure 2:
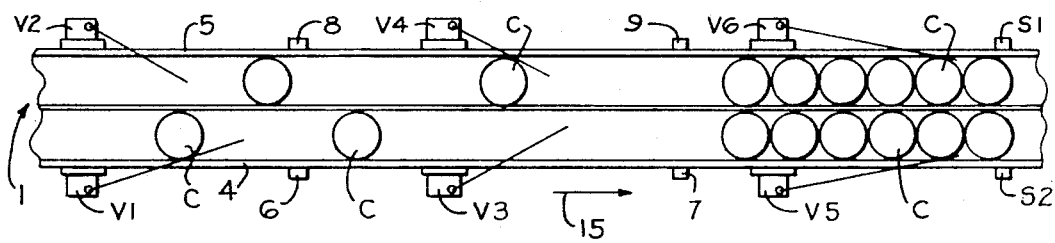
Figure 3:
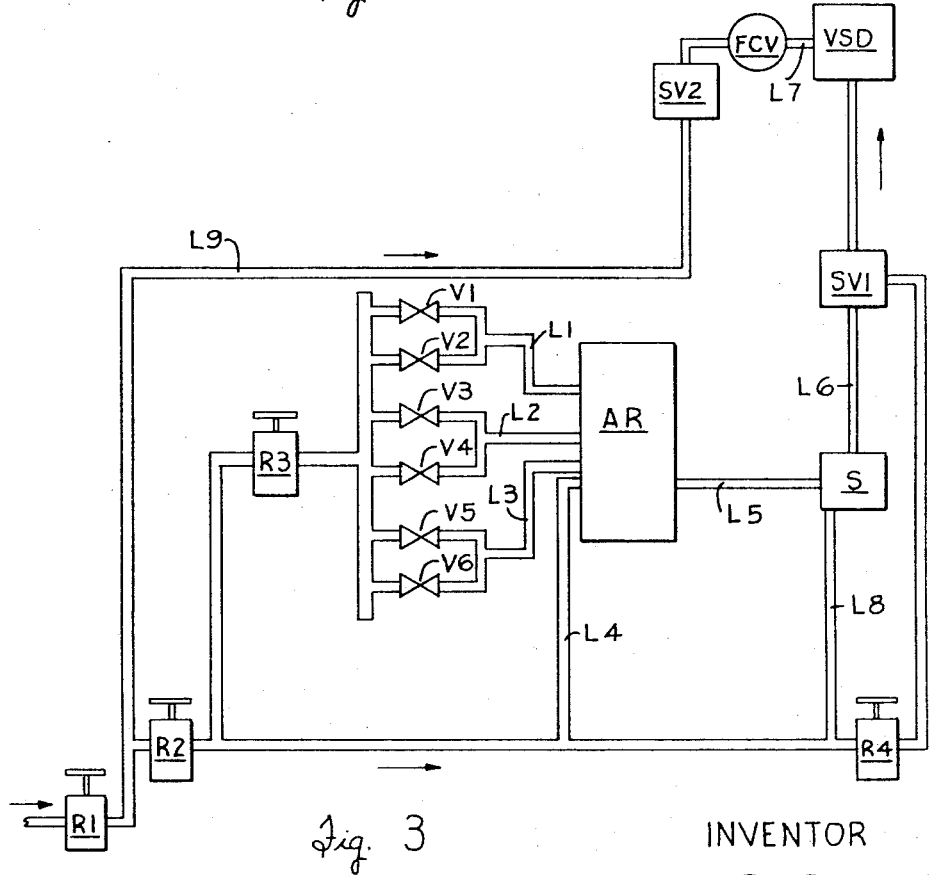
Figure 4A:
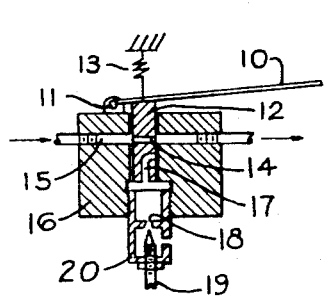
Figure 4B:
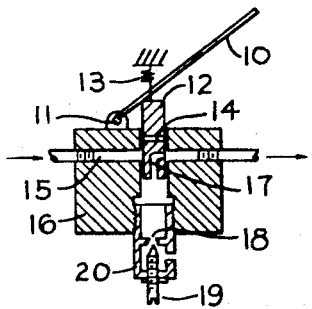
Figure 5:
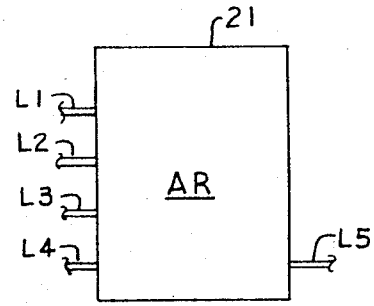
Figure 6:
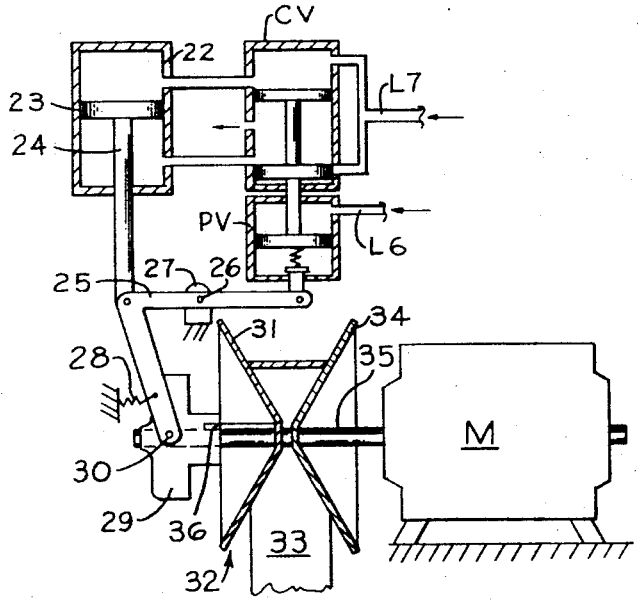

For a better understanding of the invention reference may be had to the following detailed description taken in conjunction with the accompanying drawings in which FIG. 1 is a side view of a portion of an infeed conveyor by which items such as cans are fed into a device such as a packaging machine; FIG. 2 is a top view of the arrangement depicted in FIG. 1; FIG. 3 is an overall schematic system view of the various components which constitute elements of a control system constructed according to this invention; FIG. 4A is an enlarged sectional view of an open three way pneumatic valve constituting an essential element of the system; FIG. 4B is a view similar to FIG. 4A but showing the valve closed; FIG. 5 is a schematic and diagrammatic view of a conventional averaging relay which also constitutes an essential part of the system and in which FIG. 6 is a schematic view of control means and operating means which respond to signals from the sensing means.

With reference to the drawings and particularly with respect to FIGS. 1 and 2, base element 1 is supported on a pair of upright pedestals 2 and 3 which are mounted on the floor or on a suitable base structure. Guide rails 4 and 5 are mounted on opposite sides of the infeed conveyor and are supported by upright elements such as are indicated at 6, 7, 8 and 9. Items disposed on the infeed conveyor 1 as shown in FIGS. 1 and 2 constitute a plurality of cans C. It will be understood that the particular type of infeed conveyor is not of any particular significance insofar as this invention is concerned.

For the purpose of sensing the presence and concentration of items to be handled such as C, a plurality of pneumatic sensing valves V1, V2, V3, V4, V5 and V6 are mounted along the path of movement of the items C. Preferably each of these sensing valves is affixed to suitable base structure which in turn is secured by any suitable means to the side rails 4 and 5.

An enlarged sensing valve is depicted in cross-section in FIGS. 4A and 4B and comprises a feeler element 10 pivotally mounted at 11 and engageable near its left hand end with a vertically reciprocable valve element 12 which is biased upwardly as indicated by the schematically represented spring 13. Thus as the items on the infeed conveyor C move from left to right as indicated by the arrows 14 and 15, the feeler elements such as 10 are engaged by the cans as they pass each valve. Such engagement imparts a rotation to the feeler element 10 of the valve depicted in FIGS. 4A and 4B which is in a clockwise direction and which thus imparts downward movement to the valve plunger 12 against the action of tension spring 13. The valve of FIG. 4A is shown in the open position with the passageway 14 in valve plunger 12 in alignment with the main passageway 15 formed in the main body structure 16 of the valve.

When the valve such as that shown in FIG. 4B is closed indicating the absence of a can C in the immediate vicinity of the feeler element 10, the exhaust passage 17 formed in the lower end of valve plunger 12 is arranged with its upper end in communication with the right hand end of passageway 15. Thus pressure on the right hand side of the valve is bled to atmosphere through a metering aperture 18 controlled by an adjustable needle valve 19 and through exhaust ports 20. Adjustment of needle valve 19 effects variations in the rate at which exhaust pressure in passageway 15 is bled to atmosphere when the valve is closed with its plunger 12 in the upper position.

Of course all of the valves V1–V6 are identical in construction and according to the invention pressures from the valves are supplied to an averaging relay designated AR, the sensing valves V1–V6 and the averaging relay AR constituting the sensing means of this invention.

The averaging relay is of known construction and as depicted in FIG. 5 is provided with a plurality of input signal ports and a single output port. Thus an output control pressure in line L5 reflects an average pressure from lines L1–L3. Conduit L4 supplies a constant working pressure for the averaging relay. The averaging relay AR, being of conventional construction, is utilized in the control system of this invention in a manner best shown in FIG. 3.

In a particular system, a suitable source of pressure at approximately 100 pounds per square inch is supplied from a source of fluid under pressure to the regulator R1 where the pressure is reduced to a lesser amount such as 60 pounds per square inch. This pressure is supplied through regulators R2 and R3 to the valves V1–V6 in a parallel arrangement. The pressure exhausted from regulator R2 is approximately 20 pounds per square inch while that exhausted from regulator R3 is approximately 15 pounds per square inch. Pressure through sensing valves V1–V6 is supplied to the averaging relay AR through conduits L1, L2 and L3, the magnitude of which depends upon the location and movement of cans C on the infeed conveyor. The output pressure in a particular system from averaging relay AR may vary from approximately zero pounds per square inch to approximately 15 pounds per square inch in line L5. This control pressure is supplied to the selector valve S which is provided in known manner with manually movable elements which may accommodate passage of the pressure in line L5 through line L6 and solenoid valve SV1 to the variable speed drive VSD. Alternatively, the selector valve S may be adjusted to a nonautomatic position at which fluid pressure directly from regulator R2 is supplied through lines L8 and L6 to the variable speed drive. By this means, automatic control of speed is by-passed, if desired. Preferably selector valve S or some other known component is arranged to afford a visual indication of the magnitude of the signal in conduit L5.

Under ordinary automatic operating conditions, the control pressure supplied in line L6 from selector S is supplied through solenoid valve SV1 to the control mechanism of the variable speed drive VSD. Operating pressure of approximately 60 pounds per square inch is supplied to VSD through conduit L9 and L7. Valve FCV is simply a manually adjustable device whereby acceleration and deceleration control is effected.

Solenoid valve SV1 is disposed in line L6 and is for the purpose of slowing down the drive motor to a minimum speed when the backlog of cans C is reduced to a predetermined amount as sensed by suitable switches S1 and S2. Valve SV1 isolates pressure from selector S to drive VSD and supplies pressure to VSD at the level of the output of regulator R4.

Solenoid valve SV2 is also responsive to switches S1 and S2 and is effective to exhaust the operating pressure supplied through conduits L9 and L7 to the variable speed drive VSD when S1 and S2 sense an absence of items. In this manner the operating speed of the operating means is reduced to a minimum simultaneously with operation of solenoid valve SV1.

The variable speed drive VSD is of conventional construction. In FIG. 6 the control means comprises a cylinder 22 in which a piston 23 is reciprocable. Piston 23 is movable up and down as the control signal supplied through conduit L6 varies. Control pressure through conduit L6 imparts movement to the piston of pilot valve PV which in turn controls the position of the control valve CV piston so that an increase in control pressure causes the pistons of both valves PV and CV to move downwardly thus allowing operating pressure from conduit L7 to be supplied to the top of cylinder 22. This imparts downward movement to piston 23.

Piston rod 24 is in engagement at its lower end with a force transmitting element 25 which is pivotally mounted at pin 26 on a fixed base schematically represented at 27. Element 25 is biased in a clockwise direction by schematically represented tension spring 28. Swinging movement of element 25 about pivot 26 results in sidewise movement of collar 29 which is pinned at 30 to element 25. Collar 29 is affixed to one element 31 of a variable pulley generally designated by the numeral 32 on which belt 33 rides. The other side of the pulley comprises element 34 which is affixed rigidly to shaft 35 of motor M.

Thus with motor M running at constant speed and with pulley elements 31 and 34 mounted for rotation with shaft 35, variations in the speed of a driven device such as a packaging machine are effected due to effective changes in the diameter of the pulley 32. Of course, as is well known, such changes are effected by sidewise sliding movement of pulley element 31 from left to right, element 31 being slidably mounted on shaft 35 by key element 36 so that relative rotation between pulley element 31 and shaft 35 is prevented.

From the description thus far it is apparent that variations in the control signals supplied to cylinder 22 through conduit L6 result in vertical movement of piston 23 and its associated piston rod 24. Furthermore such movement results in sidewise movement of pulley element 31 relative to pulley element 34 and by this means the effective diameter of the driving pulley 32 is varied and in turn the speed of the driven machine such as a packaging machine is caused to vary in accordance with variations in the incoming rates of the cans C on the infeed conveyor.

Thus in accordance with this invention, precise and easily adjustable control of the system is achieved primarily via the several needle valves 19 by which the average pressure in line L5 is modified. Thus if valve V4 is closed, the pressure in its passageway 15 approaches atmospheric pressure at a rate control by its metering pin 19. Of course a similar condition obtains for all the valves V1–V6. Since the valves V1–V6 are individually adjustable and since it is always desirable to speed up the out-going rate when the backlog is in excess of a predetermined amount, valves such as V5 and V6 will be fully opened with no pressure reduction due to metering valve 19. If the backlog is below a predetermined amount, the metering valves 19 of valves V5 and V6 will tend to reduce the L5 pressure at a controlled rate and the effect is to reduce the outgoing rate. Likewise the valves sensing the incoming cans operate to increase speed of the outgoing cans when the incoming rate is increased. The frequency of operation of valves which sense the incoming rate causes a pressure in passageway 15 which is a direct function of their frequency of operation so that backlog is in effect anticipated. The control pressure can be adjusted via needle valves 19 as required for a particular installation.

The embodiments of the invention in which an exclusive property or privilege is claimed are defined as follows.

I claim:

1. A control system comprising conveyor means for moving a plurality of items along a predetermined path, sensing means responsive to the number of incoming items moving along the predetermined path in a given time interval and to the accumulated backlog of such items for producing a combined control signal the magnitude of which is directly dependent upon the number of such items, and control means responsive to said control signal for producing a control or indicating operation.

2. A control system comprising conveyor means for moving a plurality of items along a predetermined path, pneumatic control means, a source of fluid under pressure, sensing means interconnected with said source and with said control means, said sensing means being responsive to relative changes in the incoming rate of items moving along the predetermined path and in the backlog of items accumulated along said path so as to change the pressure of fluid supplied to said control means, and operating means controlled by said control means for effecting changes in the outgoing rate.

3. A system according to claim 2 wherein said sensing means comprises a pneumatic valve having a feeler element disposed in the path of movement of said items for supplying pressure fluid to said control means in coordination with engagement therebetween and wherein pressure fluid from said valve is bled to atmosphere when said feeler element is out of engagement with said items.

4. A system according to claim 3 wherein adjustable means is associated with said valve for regulating the rate at which pressure fluid is bled to atmosphere and thereby to modify the action of said control means.

5. A system according to claim 2 wherein said sensing means comprises a plurality of pneumatic valves disposed in spaced relation to each other along the path of movement of said items and wherein a pneumatic averaging relay is interconnected with said valves and operable to produce a signal dependent on fluid pressure supplied thereto from all of said valves.

6. A system according to claim 5 wherein said valves are arranged in pairs with the valves of each pair disposed on opposite sides of the path of movement of the items and wherein the pressure fluid from each valve of each pair of valves is combined in a common conduit with that of the other valve of each pair before being supplied to said relay.

References Cited

UNITED STATES PATENTS

| | | | |
|---|---|---|---|
| 2,493,464 | 1/1950 | Nelson | 198—40 |
| 2,893,535 | 7/1959 | Kay | 198—21 |
| 2,901,083 | 8/1959 | McGrath | 198—21 |
| 3,244,267 | 4/1966 | Berta | 198—21 XR |
| 2,321,455 | 6/1943 | Byrne. | |
| 2,369,681 | 2/1945 | Miles. | |
| 2,805,755 | 9/1957 | Jones. | |
| 3,012,652 | 12/1961 | Poel et al. | 198—127 |
| 3,156,345 | 11/1964 | De Good | 198—127 |

FRED C. MATTERN, JR., Primary Examiner

JAMES A. WONG, Assistant Examiner

U.S. Cl. X.R.

198—40